(12) United States Patent
Takahashi

(10) Patent No.: US 8,511,689 B2
(45) Date of Patent: Aug. 20, 2013

(54) SHAFT SEALING APPARATUS

(75) Inventor: Hidekazu Takahashi, Minato-Ku (JP)

(73) Assignee: Eagle Industry Co., Ltd., Minato-Ku (JP)

( * ) Notice: Subject to any disclaimer, the term of this patent is extended or adjusted under 35 U.S.C. 154(b) by 25 days.

(21) Appl. No.: 13/260,429

(22) PCT Filed: Feb. 24, 2010

(86) PCT No.: PCT/JP2010/052846
§ 371 (c)(1),
(2), (4) Date: Sep. 26, 2011

(87) PCT Pub. No.: WO2010/113573
PCT Pub. Date: Oct. 7, 2010

(65) Prior Publication Data
US 2012/0025473 A1    Feb. 2, 2012

(30) Foreign Application Priority Data
Mar. 31, 2009  (JP) ................................. 2009-086857

(51) Int. Cl.
*F16J 15/34*    (2006.01)
*F16J 15/38*    (2006.01)

(52) U.S. Cl.
USPC ............................ 277/361; 277/390; 277/394

(58) Field of Classification Search
CPC .... F16J 15/348; F16J 15/3256; F16J 15/3464
USPC ................ 277/361, 370, 371, 374, 390, 393, 277/394
See application file for complete search history.

(56) References Cited

U.S. PATENT DOCUMENTS

| | | | | |
|---|---|---|---|---|
| 4,418,919 A | * | 12/1983 | Wentworth | 277/371 |
| 4,421,327 A | * | 12/1983 | Morley et al. | 277/381 |
| 4,586,719 A | * | 5/1986 | Marsi et al. | 277/385 |
| 4,691,927 A | * | 9/1987 | Sudol et al. | 277/360 |
| 5,556,110 A | * | 9/1996 | Marsi et al. | 277/397 |
| 5,938,205 A | * | 8/1999 | Azibert et al. | 277/361 |
| 6,708,980 B2 | * | 3/2004 | Takahashi | 277/380 |
| 2003/0042681 A1 | | 3/2003 | Takahashi | |

FOREIGN PATENT DOCUMENTS

| | | |
|---|---|---|
| JP | 2003-074714 A1 | 3/2003 |
| JP | 2006-083893 A1 | 3/2006 |
| JP | 2008-025654 A1 | 2/2008 |
| WO | 2009/008288 A1 | 1/2009 |

* cited by examiner

*Primary Examiner* — Saul Rodriguez
*Assistant Examiner* — Nathan Cumar
(74) *Attorney, Agent, or Firm* — Burr & Brown

(57) ABSTRACT

A shaft sealing apparatus of including a first mechanical seal having a mating ring disposed at the sealed fluid side and which rotates along with a shaft as the inner circumference side thereof is fixed to the shaft side, and a sealing ring disposed at the air side with respect to the mating ring and is slidable against the mating ring and which does not rotate along with the shaft. An annular space in which the sealed fluid exists is formed at the outer circumferential face side of the first mechanical seal. The shaft sealing apparatus further includes a protection cover disposed adjacent to the sealed fluid side of the seal cover in a state of being sealed with the seal cover and with the first mechanical seal respectively by an O-ring so as to suppress exposure of the seal cover to the sealed fluid.

7 Claims, 2 Drawing Sheets

SHAFT SEALING APPARATUS

FIELD OF THE INVENTION

The present invention relates to a shaft sealing apparatus having a mechanical seal.

DESCRIPTION OF RELATED ART

In the related art, there has been known a technology to attach a shaft sealing apparatus having a mechanical seal to a shaft sealing portion of a casing of a pump. In such a technology, there has been known a shaft sealing apparatus which is configured to arrange mechanical seals aligned at two positions in the axial direction and to feed quenching liquid to a regional space between the mechanical seals at the two positions. An example of the shaft sealing apparatus according to the related art will be described with reference to FIG. 2. FIG. 2 is a schematic sectional view of the shaft sealing apparatus according to the related art.

The shaft sealing apparatus according to the related art is to seal an annular gap between a shaft 800 and a housing (i.e., a casing of a pump) 900. The shaft sealing apparatus includes a first mechanical seal 600 which is disposed to a sealed fluid side (R) and a second mechanical seal 700 which is disposed to an air side (A). The first mechanical seal 600 and the second mechanical seal 700 are attached to the outer circumference side of a sleeve 810 which protects the shaft 800.

The first mechanical seal 600 includes a mating ring 610 and a sealing ring 620. Similarly, the second mechanical seal 700 includes a mating ring 710 and a sealing ring 720. Here, the mating rings 610, 710 are rotating rings which rotate along with the shaft 800. The sealing rings 620, 720 are stationary rings which do not rotate along with the shaft 800 as being fixed to the housing 900 side.

Further, a metal-made seal cover 1000 is arranged at the outer circumference side of the first mechanical seal 600 and the second mechanical seal 700. A fluid passage 1010 for feeding quenching liquid to a regional space between the first mechanical seal 600 and the second mechanical seal 700 is formed at the seal cover 1000. Here, fluid pressure of the quenching liquid to be fed to the regional space is set to be higher than fluid pressure of the sealed fluid.

The shaft sealing apparatus according to the related art is configured to feed the quenching liquid to an annular space G1 between the outer circumference side of the first mechanical seal 600 and the second mechanical seal 700 and the inner circumference side of the seal cover 1000. Further, it is configured so that the sealed fluid exists in an annular space G2 between the inner circumferential face of the first mechanical seal 600 and the outer circumferential face of the sleeve 810.

Here, when the shaft sealing apparatus is utilized for a pump used in a digesting process of a paper and pulp plant, for example, solid matters such as pulp constituents and sands are contained in the sealed fluid. Such solid matters enter into the annular space G2 as well. Since the annular space G2 is formed as being a dead end, solid matters are apt to be accumulated with time. Accordingly, it is preferable to enlarge the annular space G2 so as not to accumulate solid matters. However, with the above structure in the related art, the annular space G2 is required to be formed between the inner circumferential face of the sealing ring 620 which slides against the mating ring 610 fixed to the sleeve 810 and the outer circumferential face of the sleeve 810. Therefore, it is not easy to ensure the annular space G2 to be large. For example, it is required to adopt a structure such that a stepped portion is formed at the sleeve 810 so that the outer diameter of a part where the annular space G2 is formed is to be smaller than the outer diameter of a part where the mating ring 610 is fixed. Enlarging of the annular space G2 is limited with such a method and design flexibility is narrowed as well.

Therefore, in the related art, solid matters have been apt to be accumulated at the annular space G2 as a result of incapability to sufficiently enlarge the annular space G2. Accordingly, there have been phenomena such that the first mechanical seal 600 became incapable of operating, abrasion was accelerated as a result of entering of solid matters to a sliding surface, and a sliding surface was damaged. Here, when the sliding surface of the first mechanical seal 600 is damaged, the quenching liquid having higher pressure than that of the sealed fluid enters to the sealed fluid side. The digesting process of a paper and pulp plant is a process to boil chips under high-temperature and high-pressure conditions with chemical liquor. Accordingly, when quenching liquid enters into the sealed fluid, temperature is decreased to cause decrease in efficiency of the digesting process.

In particular, in the case that sands enter to the annular space G2, centrifugal force is applied to the entered sands when the shaft 800 is rotated. Accordingly, the sands are rotated together. The rotating sands accompanied by centrifugal force severely collide with the internal circumferential face of the first mechanical seal 600 and the internal circumferential face of the seal cover 1000. Accordingly, flaws like being carved with a carving knife (i.e., so-called erosion (i.e., sand erosion)) occur at parts of the inner circumferential faces. The erosion occurrence has been a factor to shorten service life of the first mechanical seal 600 and the seal cover 1000.

In the case of a structure that the inner circumferential face of the housing (i.e., the casing of the pump) is exposed, erosion occurs at the inner circumferential face thereof as well. Accordingly, generally as in the above related art, rotating sands accompanied by centrifugal force have been prevented from colliding with the inner circumferential face of the housing 900 by covering the inner circumferential face of the housing 900 with the seal cover 1000 for the mechanical seal. Further, regarding the seal cover 1000, abrasion resistance has been improved by performing hardening treatment such as super-hard coating on a part exposed to the sealed fluid.

When such a structure is adopted, it is required that the inner circumferential face of the housing 900 is not exposed in order not to cause erosion at the inner circumferential face of the housing 900. Accordingly, it is required to thicken a part of the seal cover 1000 to which hardening treatment is performed and to replace the seal cover 1000 before the part to which hardening treatment is performed is vanished owing to abrasion.

In general, hardening treatment such as super-hard coating is high in cost. Therefore, when the part to which hardening treatment is performed is thickened, cost is extremely increased. Further, in addition to cost increase, there arises a problem that the mechanical seal cover becomes heavy and handling thereof becomes difficult when super-hard coating is performed on a relatively large member such as the mechanical seal cover.

As described above, according to the shaft sealing apparatus of the related art, there have been various problems as a result of entering of sands and the like into the annular space G2 which is difficult to be ensured to be large.

PRIOR ART REFERENCES

Patent documents

Patent document 1: Japanese Patent Application Laid-Open (JP-A) No. 2003-74714
Patent document 2: JP-A No. 2006-83893

SUMMARY OF THE INVENTION

Problems to be Solved by the Invention

The present invention provides a shaft sealing apparatus of which service life is lengthened while suppressing cost increase.

Means for Solving the Invention

In order to solve the above-mentioned problems, the present invention adopts the following means.

More specifically, a shaft sealing apparatus to seal an annular gap between a shaft and a housing, includes a first mechanical seal which is disposed at a sealed fluid side, a second mechanical seal which is disposed at an opposite side to the sealed fluid with respect to the first mechanical seal, a seal cover which is disposed at an outer circumference side of the first mechanical seal and the second mechanical seal and which has a fluid passage through which fluid flows to be fed to a regional space between the first mechanical seal and the second mechanical seal having higher pressure than that of the sealed fluid, and a protection cover which is disposed as being adjacent to the sealed fluid side of the seal cover in a state of being sealed with the seal cover and with the first mechanical seal respectively by a seal member so as to suppress exposure of the seal cover to the sealed fluid, wherein the first mechanical seal includes a rotating ring which is disposed at the sealed fluid side and which rotates along with the shaft as an inner circumference side of the rotating ring being fixed to the shaft side and a stationary ring which is disposed at the opposite side to the sealed fluid with respect to the rotating ring as being slidable against the rotating ring and which does not rotate along with the shaft, and an annular space in which the sealed fluid exists is formed at an outer circumferential face side of the first mechanical seal.

According to the present invention, the first mechanical seal adopts a structure that the rotating ring is disposed at the sealed fluid side and the stationary ring is disposed at the opposite side to the sealed fluid. With the above structure, the annular space in which the sealed fluid exists is to be formed at the outer circumferential face side of the first mechanical seal. Accordingly, compared to a case that the sealed fluid is compelled to exist in the annular space between the inner circumferential face of the first mechanical seal and the outer circumference side of the shaft by disposing the stationary ring at the sealed fluid side and disposing the rotating ring at the opposite side to the sealed fluid, the annular space can be freely enlarged. Even when solid matters such as sands are contained in the sealed fluid, it is possible to suppress accumulation of the solid matters in the annular space by enlarging the annular space as described above. In addition, since the sealed fluid exists at the outer circumferential face side of the first mechanical seal, it is possible to suppress collision of the solid matters contained in the sealed fluid with the first mechanical seal in a state of being accompanied by centrifugal force.

Further, according to the present invention, since the protection cover suppresses exposure of the seal cover to the sealed fluid, deterioration of the seal cover can be suppressed. Here, members exposed to the sealed fluid have possibility to be deteriorated by solid matters such as sands contained in the sealed fluid. Accordingly, the protection cover is a member which may be deteriorated. Therefore, the protection cover is required to be replaced when deterioration proceeds with time. In the case that the seal cover having the fluid passage through which high pressure fluid flows is exposed to the sealed fluid, the seal cover which is compelled to be relatively large and complicatedly structured is required to be replaced. However, according to the present invention, necessity of replacing the seal cover can be reduced, so that cost can be reduced.

In addition, in the shaft sealing apparatus, an annular concave portion to which an end part of the protection cover at the opposite side to the sealed fluid is fitted is arranged at an end part of the seal cover at the sealed fluid side, an annular groove is formed respectively at an inner circumferential face of the concave portion and an outer circumferential face of the protection cover at a part which is fitted to the concave portion, and the seal cover and the protection cover may be fixed by placing a seal member in an annular interspace formed by mating the annular grooves.

By adopting the above structure, the seal cover and the protection cover can be fixed with a simple structure. In addition, since the protection cover can be easily detached from the seal cover, excellent maintainability is obtained in replacing the protection cover.

All or a part including a portion to be exposed to the sealed fluid of the protection cover may be formed of hard material.

Accordingly, deterioration of the protection cover can be suppressed. That is, occurrence of erosion due to solid matters such as sands contained in the sealed fluid can be suppressed.

All or a part including a portion to be exposed to the sealed fluid of each of the rotating ring and the stationary ring may be formed of hard material.

Accordingly, deterioration of the rotating ring and the stationary ring can be suppressed. That is, occurrence of erosion due to solid matters such as sands contained in the sealed fluid can be suppressed.

A cylindrical sleeve attached for protecting the shaft is disposed to the outer circumference of the shaft and a collar for attaching the rotating ring is disposed to the outer circumference of the sleeve. In addition, the outer circumferential surface of the collar may be covered by the rotating ring, and the color may be fixed to the sleeve from the inner circumference side by a set screw which is screwed via a through hole formed at the sleeve.

Accordingly, it is possible to suppress exposure of the outer circumferential surface of the collar and the set screw to the sealed fluid.

Here, the respective structures described above can be adopted as being combined as many as possible.

Advantageous Effects of the Invention

As described above, according to the present invention, it is possible to lengthen service life while suppressing cost increase.

DETAILED DESCRIPTION OF THE INVENTION

In the following, the modes for carrying out the present invention will be described in detail based on an embodiment in an exemplification manner with reference to the drawings.

Here, dimensions, materials, shapes, relative arrangement and the like of structural components described in the embodiment are not intended to limit the scope of the present invention thereto unless otherwise specified.

Embodiment

Figure 1:
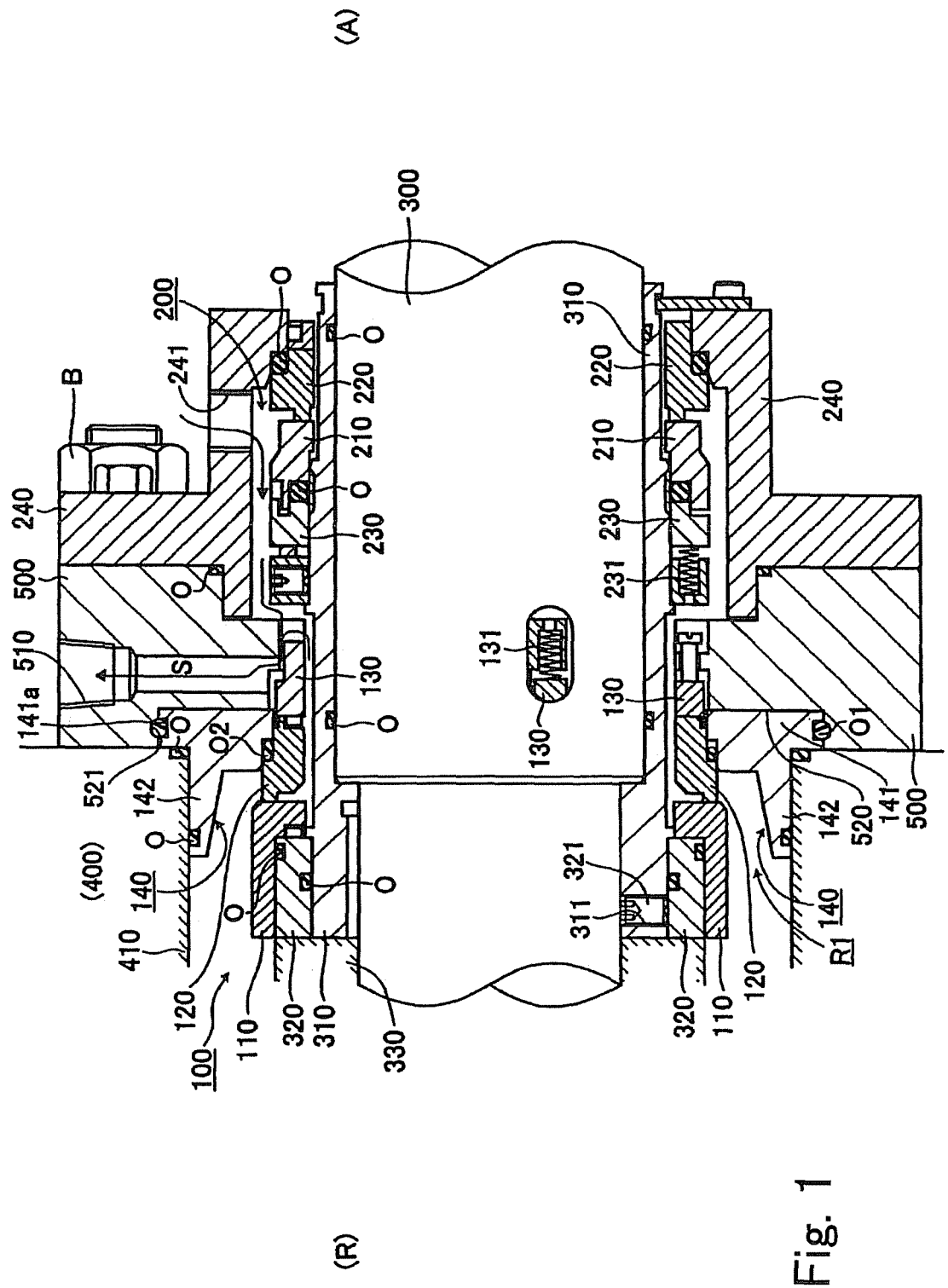
FIG. 1 is a schematic sectional view of a shaft sealing apparatus according to an embodiment of the present invention.
Figure 2:
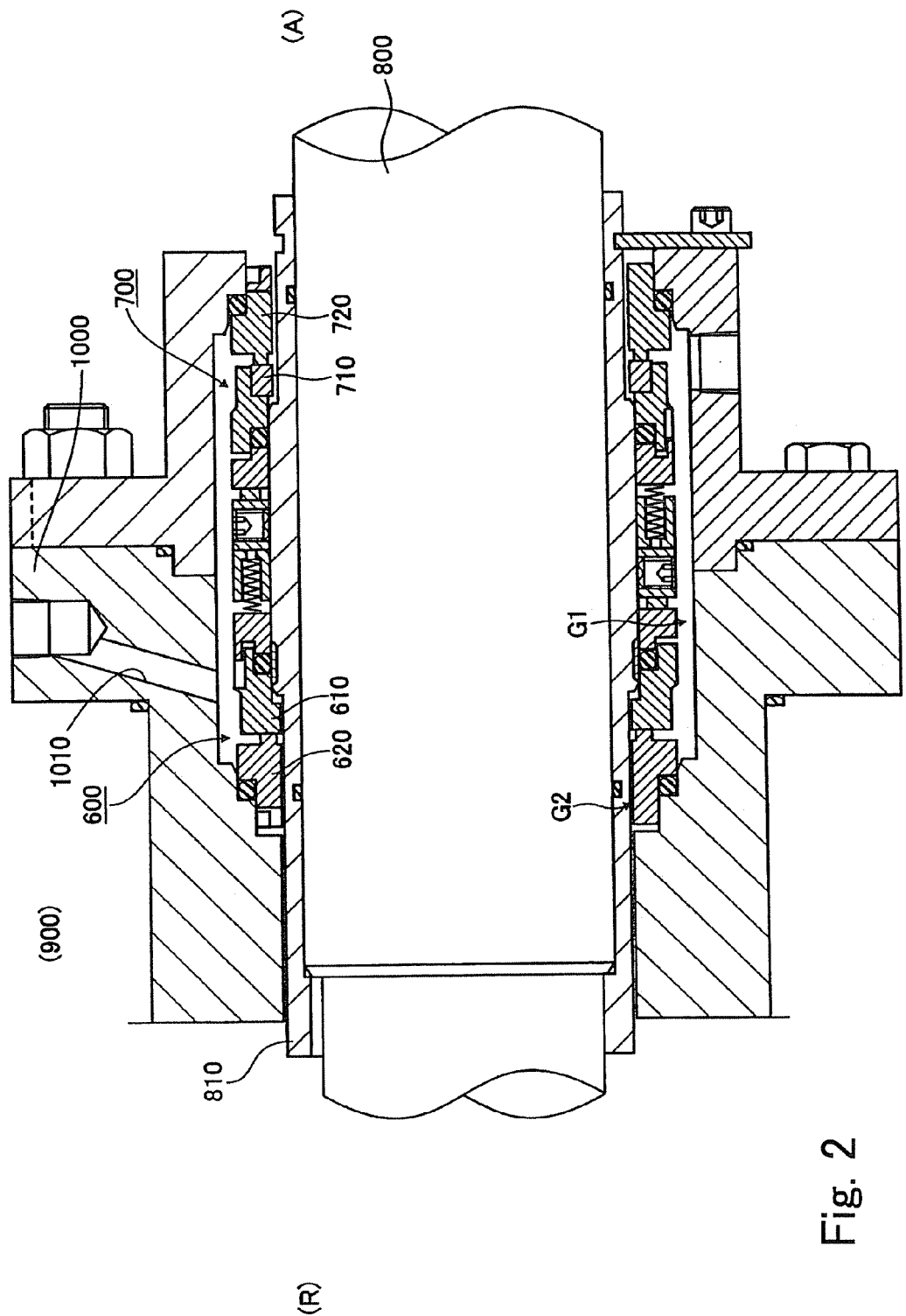
FIG. 2 is a schematic sectional view of a shaft sealing apparatus in the related art.

A shaft sealing apparatus according to an embodiment of the present invention will be described with reference to FIG. 1. Here, the shaft sealing apparatus according to the present embodiment is to be disposed to a pump used in a digesting process of a paper and pulp plant.

<Structure of Overall Shaft Sealing Apparatus>

First, a structure and the like of an overall shaft sealing apparatus according to the present embodiment will be described. The shaft sealing apparatus according to the present embodiment is to seal an annular gap between a shaft 300 and a housing (i.e., a casing of a pump) 400. Then, the shaft sealing apparatus is provided with a first mechanical seal 100 arranged at a sealed fluid side (R) and a second mechanical seal 200 arranged at an air side (A) being the opposite side to the sealed fluid with respect to the first mechanical seal 100. Here, the sealed fluid in the present embodiment is digestion liquor (i.e., chemical liquor) for boiling chips under high-temperature and high-pressure conditions. Further, a cylindrical sleeve 310 is arranged at the outer circumference of the shaft 300 to protect the shaft 300. The first mechanical seal 100 and the second mechanical seal 200 are attached to the outer circumference side of the sleeve 310.

Further, a metal-made seal cover 500 is disposed at the outer circumference side of the first mechanical seal 100 and the second mechanical seal 200. The seal cover 500 is fixed with a bolt B to an end face of the housing 400 along with a protection cover 240 which is disposed to the second mechanical seal 200.

Further, the seal cover 500 is provided with a flow passage 510 through which quenching liquid flows to be fed to a regional space between the first mechanical seal 100 and the second mechanical seal 200. In addition to lubricating, cooling, cleaning and the like of sliding surfaces of the mechanical seals, the quenching liquid is fed to the regional space aiming at forced discharging of the sealed fluid and blocking of the sliding surfaces from the air side (A). For example, fresh water can be preferably adopted as the quenching liquid. Here, in order to achieve the above aims, fluid pressure of the quenching liquid is set to be higher than fluid pressure of the sealed fluid. More specifically, it is set to be higher than the fluid pressure of the sealed fluid by the order of 0.1 to 0.3 MPa.

In the present embodiment, the quenching liquid is fed to an annular space between the inner circumferential face of the first mechanical seal 100 and the outer circumferential face of the sleeve 310, an annular space between the outer circumferential face of the second mechanical seal 200 and the inner circumferential face of the protection cover 240, and the regional space between the first mechanical seal 100 and the second mechanical seal 200 (see arrow S in the drawing). Here, the quenching liquid is fed to the inside of the shaft sealing apparatus from a through hole 241 which is formed at the protection cover 240.

The shaft sealing apparatus is constituted with a plurality of members, and then, an O-ring O is disposed at each of a plurality of positions as a sealing member in order to seal each gap between adjacent members as illustrated in the drawing.

<Second Mechanical Seal>

The second mechanical seal 200 will be described in more detail. The second mechanical seal 200 includes a mating ring 210 having a planar sliding surface and a sealing ring 220 having an annular convex portion of which distal end face is to be a sliding surface. Here, the mating ring 210 is a rotating ring which rotates along with the shaft 300 as being fixed to the shaft 300 side (more specifically, to the sleeve 310). Further, the sealing ring 220 is a stationary ring which does not rotate along with the shaft 300 as being fixed to the housing 400 side (more specifically, to the protection cover 240 which is fixed to the housing 400 along with the seal cover 500).

The second mechanical seal 200 further includes a compression ring 230 to press the mating ring 210 against the sealing ring 220 via the O-ring O. The compressing ring 230 is pressed by springs 231 which are disposed in plural circumferentially at predetermined intervals.

The abovementioned protection cover 240 is disposed at the outer circumference side of the mating ring 210, the sealing ring 220 and the compression ring 230.

<First Mechanical Seal>

The first mechanical seal 100 will be described in more detail. The first mechanical seal 100 includes a mating ring 110 having a planar sliding surface and a sealing ring 120 having an annular convex portion of which distal end face is to be a sliding surface.

Here, the mating ring 110 is a rotating ring which rotates along with the shaft 300 as being fixed to the shaft 300 side. In the present embodiment, the mating ring 110 is fixed to a metal-made cylindrical collar 320 which is fixed to the outer circumference of the sleeve 310. The collar 320 is fixed to the sleeve 310 from the inner circumference side by a set screw 321 which is screwed via a through hole 311 formed at the sleeve 310. The outer circumferential surface of the collar 320 which is fixed as described above is covered by the mating ring 110. Here, in the present embodiment, an end face of the collar 320 at the sealed fluid side (R) is also covered by an annular member 330 which is fixed to the shaft 300, so that the entire collar 320 is configured not to be exposed to the sealed fluid.

Further, the sealing ring 120 is a stationary ring which does not rotate along with the shaft 300 as being fixed to the housing 400 side (more specifically, to a later-mentioned protection cover 140 which is fixed to the housing 400 along with the seal cover 500).

The first mechanical seal 100 further includes a compression ring 130 to press the sealing ring 120 against the mating ring 110. The compression ring 130 is pressed by springs 131 which are disposed in plural circumferentially at predetermined intervals.

Then, the protection cover 140 is disposed at the outer circumference side of the mating ring 110, the sealing ring 120 and the compression ring 130. The protection cover 140 is configured to be detachably attachable to the seal cover 500 so as to be capable of being attached to a shaft sealing portion as one component. Description will be made more specifically on this point.

An annular concave portion 520 to which an end part 141 of the protection cover 140 at the air side (A) is fitted is formed at an end part of the seal cover 500 at the sealed fluid side (R). An annular groove 521 having a shallow groove bottom is formed at the inner circumferential face of the concave portion 520. An annular groove 141a is also formed at the outer circumferential face of the protection cover 140 at a part to be fitted to the concave portion 520. Then, an O-ring O1 being a sealing member is placed in an annular interspace formed by mating the annular grooves 521, 141*a*, so that the seal cover 500 and the protection cover 140 are fixed.

Here, when the above are to be fixed, the end part 141 of the protection cover 140 is fitted to the concave portion 520 of the seal cover 500 in a state that the O-ring O1 is preliminarily attached to the annular groove 141*a* having a relatively deep groove bottom formed at the protection cover 140. During the process to fit the end part 141 of the protection cover 140 to the concave portion 520, the O-ring O1 slides on the inner circumferential face of the concave portion 520 in a state that the outer circumference thereof is shrunk. When the end part 141 of the protection cover 140 hits the end face of the concave portion 520, the annular grooves 521, 141*a* are in a mated state. Accordingly, the outer circumference of the O-ring O1 is expanded, so that the O-ring O1 is intimately contacted to the respective groove bottom faces of the annular grooves 521, 141*a* and is fitted respectively to the annular grooves 521, 141*a*. Consequently, the seal cover 500 and the protection cover 140 are fixed. Here, when force is exerted so as to separate the protection cover 140 from the seal cover 500 in a manner to pull out the end part 141 of the protection cover 140 from the concave portion 520, the protection cover 140 can be detached from the seal cover 500. In this case, it is only required to exert the force to elastically deform the O-ring O1 of which outer circumference is to be shrunk, the protection cover 140 can be easily detached from the seal cover 500. In this manner, attaching and detaching of the seal cover 500 and the protection cover 140 are easily performed.

In a state that the protection cover 140 is fixed to the seal cover 500 and those are fixed to the shaft sealing portion, the protection cover 140 is arranged as being adjacent to the sealed fluid side (R) of the seal cover 500. Further, the above-mentioned O-ring O1 seals between the protection cover 140 and the seal cover 500. Furthermore, an O-ring O2 seals between the inner circumferential face of the protection cover 140 and the outer circumferential face of the sealing ring 120.

Further, the protection cover 140 includes an annular convex portion 142 which is configured to be protruded to the sealed fluid side (R) and to be intimately contacted to the inner circumferential face of the housing 400. Further, two of the O-rings O form a seal between the outer circumferential face of the annular convex portion 142 and the inner circumferential face of the housing 400. Here, in the present embodiment, the annular convex portion 142 is configured to sufficiently extend to the sealed fluid side (R) for protecting the housing 400.

The seal cover 500 is protected by the protection cover 140 which is structured as described above so as not to be exposed to the sealed fluid.

In the first mechanical seal 100 which is structured as described above, members to be exposed to the sealed fluid are the mating ring 110, the sealing ring 120 and the protection cover 140. Then, the mating ring 110, the sealing ring 120 and the protection cover 140 are formed of hard material having excellent abrasion resistance. Preferable examples of the hard material specifically include silicon carbide (SiC) and cemented carbide. Here, not adopting such hard material as material itself of those members, it is also possible to perform super-hard coating on the surface thereof so that a portion including a part to be exposed to the sealed fluid is formed of hard material having excellent abrasion resistance. Further, in the present embodiment, super-hard coating 410 is also performed on the inner circumferential face of the housing 400 to be exposed to the sealed fluid. Here, not performing super-hard coating 410 on the inner circumferential face of the housing 400, it is also possible to adopt a structure to fit a ring made of hard material such as silicon carbide (SiC) and cemented carbide to the inner circumferential face thereof.

Advantages of Shaft Sealing Apparatus of the Present Embodiment

According to the shaft sealing apparatus of the present embodiment, the first mechanical seal 100 adopts the structure that the mating ring 110 being the rotational ring fixed to the shaft 300 side is disposed at the sealed fluid side (R) and the sealing ring 120 being the stationary ring fixed to the housing 400 side is disposed at the air side (A). With this structure, an annular space R1 in which the sealed fluid exists is formed at the outer circumferential face side of the first mechanical seal 100.

Accordingly, compared to a case that the sealed fluid is compelled to exist in the annular space between the inner circumferential face of the first mechanical seal and the outer circumference side of the shaft by disposing the stationary ring at the sealed fluid side and disposing the rotating ring at the opposite side to the sealed fluid, the annular space R1 can be freely enlarged. Even when solid matters such as sands are contained in the sealed fluid, it is possible to suppress accumulation of the solid matters in the annular space R1 by enlarging the space of the annular space R1. Here, since the annular space R1 can be formed without forming a stepped portion at the shaft and the sleeve, it is possible to obtain another advantage to suppress decrease in strength of the shaft and the sleeve.

As described above, according to the shaft sealing apparatus of the present embodiment, accumulation of solid matters in the annular space R1 can be suppressed and operational failure occurrence at the first mechanical seal 100 can be suppressed. Further, it is possible to suppress entering of solid matters to the sliding surfaces of the first mechanical seal 100 (more specifically, the sliding surfaces of the mating ring 110 and the sealing ring 120). Accordingly, acceleration of sliding abrasion and damages at the sliding surfaces can be suppressed. In addition, since the sealed fluid exists at the outer circumferential face side of the first mechanical seal 100, it is possible to suppress collision of solid matters contained in the sealed fluid in a state of having centrifugal force with the first mechanical seal 100.

Further, according to the shaft sealing apparatus of the present embodiment, the protection cover 140 suppresses exposure of the seal cover 500 to the sealed fluid. Accordingly, deterioration of the seal cover 500 can be suppressed.

Here, members exposed to the sealed fluid have possibility to be deteriorated by solid matters such as sands contained in the sealed fluid. Accordingly, the protection cover 140 is a member which may be deteriorated. Therefore, the protection cover 140 is required to be replaced when deterioration proceeds with time.

In the case that the seal cover having the fluid passage through which high pressure fluid flows is exposed to the sealed fluid as in the related art, the seal cover which is compelled to be relatively large and complicatedly structured is required to be replaced. However, on the other hand, according to the shaft sealing apparatus of the present embodiment, it is only necessary to replace the protection cover with little necessity to replace the seal cover 500. Accordingly, it is possible to reduce cost for member replacement.

Further, in the present embodiment, the structure capable of easily performing attaching and detaching of the seal cover 500 and the protection cover 140 as placing the O-ring O1 in the annular interspace formed by mating the annular grooves 521, 141a which are formed respectively at the seal cover 500 and the protection cover 140 so as to adopt. In this manner, excellent maintainability is obtained in replacing the protection cover 140.

Further, in the present embodiment, various members (i.e., the mating ring 110, the sealing ring 120, the protection cover 140 and the housing 400) exposed to the sealed fluid are made of hard material entirely or partially including portions to be exposed to the sealed fluid. Accordingly, deterioration of the various members can be suppressed. More specifically, it is possible to suppress occurrence of erosion due to solid matters such as sands contained in the sealed fluid. Here, regarding the housing 400, it is configured to suppress exposure of the vicinity of the end face at the air side (A) to the sealed fluid by the annular convex portion 142 disposed at the protection cover 140. Accordingly, deterioration is suppressed particularly at the vicinity. By the way, in order to suppress deterioration of various members exposed to the sealed fluid due to solid matters contained in the sealed fluid, it is only required to entirely or partially form the various members of hard material being harder than the solid matters (e.g., sands in the present embodiment).

Further, in the present embodiment, since the entire metal-made collar 320 is configured not to be exposed to the sealed fluid, it is also possible to suppress erosion occurrence at the collar 320. The collar 320 is fixed to the sleeve 310 from the inner circumference side by the set screw 321 which is screwed via the through hole 311 formed at the sleeve 310. Accordingly, the set screw 321 is prevented from dropping out owing to the surface of the shaft 300. In addition, since the set screw 321 is not exposed to the sealed fluid as well, erosion occurrence is prevented.

As described above, according to the shaft sealing apparatus of the present embodiment, service life of various members can be lengthened by suppressing occurrence of erosion due to sands and the like. Further, components having possibility to be deteriorated as being exposed to the sealed fluid are limited and there is no need to replace components which are compelled to be relatively large and complicatedly structured such as a seal cover having a fluid passage through which high pressure fluid flows. Accordingly, it is possible to reduce cost required for replacing members. Furthermore, as described above, it is possible to reduce cost for maintenance owing to excellent maintainability.

DESCRIPTION OF NUMERALS AND SYMBOLS

100 First mechanical seal
110 Mating ring
120 Sealing ring
130 Compression ring
131 Spring
140 Protection cover
141 End part
141a Annular groove
142 Annular convex portion
200 Second mechanical seal
210 Mating ring
220 Sealing ring
230 Compression ring
231 Spring
240 Protection cover
241 Through hole
300 Shaft
310 Sleeve
311 Through hole
320 Collar
321 Set screw
330 Annular member
400 Housing
410 Super-hard coating
500 Seal cover
510 Fluid passage
520 Concave portion
521 Annular groove
B Bolt
O, O1, O2 O-ring
R1 Annular space

The invention claimed is:

1. A shaft sealing apparatus to seal an annular gap between a shaft and a housing, comprising:
a first mechanical seal which is disposed at a sealed fluid side;
a second mechanical seal which is disposed at an opposite side to the sealed fluid with respect to the first mechanical seal;
a seal cover which is disposed at an outer circumference side of the first mechanical seal and the second mechanical seal and which has a fluid passage through which fluid flows to be fed to a regional space between the first mechanical seal and the second mechanical seal having higher pressure than that of the sealed fluid; and
a protection cover which is disposed as being adjacent to the sealed fluid side of the seal cover in a state of being sealed with the seal cover and with the first mechanical seal respectively by a seal member so as to suppress exposure of the seal cover to the sealed fluid,
wherein the first mechanical seal includes a rotating ring which is disposed at the sealed fluid side and which rotates along with the shaft as an inner circumference side of the rotating ring being fixed to the shaft side and a stationary ring which is disposed at the opposite side to the sealed fluid with respect to the rotating ring as being slidable against the rotating ring and which does not rotate along with the shaft,
an annular space in which the sealed fluid exists is formed at an outer circumferential face side of the first mechanical seal,
the seal cover has an annular concave portion to which an end part of the protection cover at the opposite side to the sealed fluid is fitted and arranged in an end part of the concave portion,
an annular groove is formed in an inner circumferential face of the concave portion and an opposed annular groove is formed in an outer circumferential face of the protection cover at a part of the protection cover fitted to the concave portion,
the seal cover and the protection cover are fixed by placing a seal member in an annular interspace formed by the opposed annular grooves, and
the protection cover has an inner circumferential annular groove, the stationary ring has an outer circumferential annular groove, and a seal member is contained within a recess formed by said inner and outer circumferential annular grooves.

2. The shaft sealing apparatus according to claim 1, wherein all or a part including a portion to be exposed to the sealed fluid of the protection cover is formed of hard material.

3. The shall sealing apparatus according to claim 1, wherein all or a part including a portion to be exposed to the sealed fluid of each of the rotating ring and the stationary ring is formed of hard material.

4. The shaft sealing apparatus according to claim 1,
wherein a cylindrical sleeve attached for protecting the shaft is disposed to the outer circumference of the shaft;
a collar for attaching the rotating ring is disposed to the outer circumference of the sleeve;
the outer circumferential surface of the collar is covered by the rotating ring; and
the color is fixed to the sleeve from the inner circumference side by a set screw which is screwed via a through hole formed at the sleeve.

5. The shaft sealing apparatus according to claim 2,
wherein all or a part including a portion to be exposed to the sealed fluid of each of the rotating ring and the stationary ring is formed of hard material.

6. The shaft sealing apparatus according to claim 2,
wherein a cylindrical sleeve attached for protecting the shaft is disposed to the outer circumference of the shaft;
a collar for attaching the rotating ring is disposed to the outer circumference of the sleeve;
the outer circumferential surface of the collar is covered by the rotating ring; and
the color is fixed to the sleeve from the inner circumference side by a set screw which is screwed via a through hole formed at the sleeve.

7. The shaft sealing apparatus according to claim 3,
wherein a cylindrical sleeve attached for protecting the shaft is disposed to the outer circumference of the shaft;
a collar for attaching the rotating ring is disposed to the outer circumference of the sleeve;
the outer circumferential surface of the collar is covered by the rotating ring; and
the color is fixed to the sleeve from the inner circumference side by a set screw which is screwed via a through hole formed at the sleeve.

\* \* \* \* \*